US012600380B2

(12) United States Patent
Chun

(10) Patent No.: US 12,600,380 B2
(45) Date of Patent: Apr. 14, 2026

(54) AUTONOMOUS DRIVING CONTROL APPARATUS FOR DETERMINING A ROAD SECURITY MIRROR AND METHOD THEREOF

(71) Applicants: Hyundai Motor Company, Seoul (KR); Kia Corporation, Seoul (KR)

(72) Inventor: Sang Woo Chun, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 153 days.

(21) Appl. No.: 18/456,172

(22) Filed: Aug. 25, 2023

(65) Prior Publication Data

US 2024/0383502 A1 Nov. 21, 2024

(30) Foreign Application Priority Data

May 15, 2023 (KR) ........................ 10-2023-0062645

(51) Int. Cl.
*B60W 60/00* (2020.01)
*G06V 20/56* (2022.01)

(52) U.S. Cl.
CPC ......... *B60W 60/0015* (2020.02); *G06V 20/56* (2022.01); *B60W 2420/403* (2013.01); *B60W 2552/53* (2020.02)

(58) Field of Classification Search
CPC ......... B60W 60/0015; B60W 2552/53; B60W 2420/403; G06V 20/56
See application file for complete search history.

(56) References Cited

U.S. PATENT DOCUMENTS

2004/0156132 A1* 8/2004 Garcia ............... G02B 17/0615
359/857
2022/0253065 A1* 8/2022 Toyoura ................. G05D 1/024

FOREIGN PATENT DOCUMENTS

WO WO-2021245515 A1 * 12/2021 ........... G06V 20/582

* cited by examiner

*Primary Examiner* — Scott A Browne
*Assistant Examiner* — Terry C Buse
(74) *Attorney, Agent, or Firm* — Slater Matsil, LLP

(57) ABSTRACT
An embodiment of an autonomous driving control apparatus includes a sensor device, a memory storing at least one instruction, and a controller operatively connected with the sensor device and the memory. The at least one instruction can be configured to, when executed by the controller, cause the autonomous driving control apparatus to perform operations including identifying a road security mirror being present in front of a host vehicle, using the sensor device, stop driving movement of the host vehicle, in response to the road security mirror meeting a specified condition, detecting an image change rate of at least one security mirror included in the road security mirror, and resume driving the host vehicle, in response to the image change rate being less than or equal to a specified value during a specified time.

20 Claims, 10 Drawing Sheets

AUTONOMOUS DRIVING CONTROL APPARATUS FOR DETERMINING A ROAD SECURITY MIRROR AND METHOD THEREOF

CROSS-REFERENCE TO RELATED APPLICATIONS

This application claims the benefit of Korean Patent Application No. 10-2023-0062645, filed on May 15, 2023, which application is hereby incorporated herein by reference.

TECHNICAL FIELD

The present disclosure relates to an autonomous driving control apparatus and a method thereof.

BACKGROUND

As autonomous vehicles have been gradually spread, various technologies about autonomous driving have been developed. For example, for stable driving of an autonomous vehicle, a technology for measuring a driving environment, a technology for controlling the driving of the vehicle in response to the measured driving environment, and a technology for accurately detecting an object (e.g., another vehicle) which is present outside the autonomous vehicle should be developed.

The autonomous vehicle may obtain driving information using at least one sensor included in the autonomous vehicle and may identify information about an expected driving route and a driving environment, thus performing driving control for the host vehicle. For example, the autonomous vehicle may obtain information about an area adjacent to the host vehicle using a camera included in the autonomous vehicle and may identify whether it is possible for the host vehicle to safely travel using the obtained information, thus controlling autonomous driving of the host vehicle.

However, there may be limitations to autonomous driving control using the camera depending on a type of a road where the host vehicle is traveling or a situation in front of the host vehicle. For example, when the host vehicle is traveling at an intersection, it may be difficult to obtain information about another vehicle which is traveling in at least some lines of the intersection with respect to the host vehicle (e.g., a left or right line with respect to the host vehicle) using the camera of the host vehicle.

SUMMARY

The present disclosure relates to an autonomous driving control apparatus and a method thereof, and more particularly, relates to technologies of stopping driving of a host vehicle when a road security mirror is identified when the host vehicle travels at an intersection to obtain information about a surrounding environment using an image identified by the road security mirror and determining whether the host vehicle is safe to resume driving the host vehicle.

Embodiments of the present disclosure can be made to solve the above-mentioned problems occurring in the prior art while advantages achieved by the prior art can be maintained intact.

According to an embodiment of the present disclosure, an autonomous driving control apparatus for identifying a road security mirror located in a portion of an area on a specified type of road, when a host vehicle travels on the specified type of road, and controlling autonomous driving of the host vehicle using an image change rate of an image obtained by use of the road security mirror and a method thereof.

According to an embodiment of the present disclosure, an autonomous driving control apparatus can be configured for first determining whether a road security mirror identified as being adjacent to a host vehicle meets a specified condition to determine whether the road security mirror is valid for autonomous driving control of the host vehicle and then detecting an image change rate and a method thereof.

According to an embodiment of the present disclosure, an autonomous driving control apparatus can be configured for controlling autonomous driving of a host vehicle using image change rates of some of roads in an image obtained by use of a road security mirror, further using an expected driving route of the host vehicle, and a method thereof.

The technical problems to be solved by an embodiment of the present disclosure are not necessarily limited to the aforementioned problems, and any other technical problems not mentioned herein can be clearly understood from the following description by those skilled in the art to which the present disclosure pertains.

According to an embodiment of the present disclosure, an autonomous driving control apparatus can include a sensor device, a memory storing at least one instruction, and a controller operatively connected with the sensor device and the memory. For example, the at least one instruction can be configured to, when executed by the controller, cause the autonomous driving control apparatus to identify a road security mirror being present in front of a host vehicle, using the sensor device, stop driving the host vehicle, when the road security mirror meets a specified condition, detect an image change rate of at least one security mirror included in the road security mirror, and resume driving the host vehicle, when the image change rate is less than or equal to a specified value during a specified time.

According to an embodiment, the at least one instruction can be configured to, when executed by the controller, cause the autonomous driving control apparatus to determine that the road security mirror meets the specified condition, when the road security mirror is present at the right of a driving direction of the host vehicle or includes two security mirrors.

According to an embodiment, the at least one instruction can be configured to, when executed by the controller, cause the autonomous driving control apparatus to determine that the road security mirror meets the specified condition, when a horizontal length of the road security mirror is greater than half of a vertical length of the road security mirror when viewed from the host vehicle.

According to an embodiment, the at least one instruction can be configured to, when executed by the controller, cause the autonomous driving control apparatus to determine that the road security mirror does not meet the specified condition, when it is identified that the road security mirror is present in an area within a specified angle with respect to a real-time driving direction of the host vehicle.

According to an embodiment, the at least one instruction can be configured to, when executed by the controller, cause the autonomous driving control apparatus to determine that the road security mirror meets the specified condition, when a shortest distance from a furthest road line from the host vehicle among horizontal lines at an intersection being present in front of the host vehicle to the road security mirror is within a specified range.

According to an embodiment, the at least one instruction can be configured to, when executed by the controller, cause the autonomous driving control apparatus to determine that the road security mirror meets the specified condition, when a vertical length of the road security mirror corresponds to a specified length.

According to an embodiment, the at least one instruction can be configured to, when executed by the controller, cause the autonomous driving control apparatus to identify an expected driving route of the host vehicle, identify a specified security mirror among the at least one security mirror of the road security mirror, based on the expected driving route, and determine at least one road to identify the image change rate among roads in an image identified by use of the specified security mirror, based on the expected driving route.

According to an embodiment, the at least one instruction can be configured to, when executed by the controller, cause the autonomous driving control apparatus to, when the host vehicle is traveling at a T-shaped intersection, identify a left security mirror among the at least one security mirror of the road security mirror as the specified security mirror, when the expected driving route of the host vehicle corresponds to a right turn, and identify the image change rate for a road above a center line among the roads in the image identified by use of the left security mirror.

According to an embodiment, the at least one instruction can be configured to, when executed by the controller, cause the autonomous driving control apparatus to, when the host vehicle is traveling at a T-shaped intersection, identify a left security mirror and a right security mirror among the at least one security mirror of the road security mirror as the specified security mirror, when the expected driving route of the host vehicle corresponds to a left turn, identify the image change rate for a road above a first center line among the roads in the image identified by use of the left security mirror, and identify the image change rate for a road below a second center line among the roads in the image identified by use of the right security mirror.

According to an embodiment, the at least one instruction can be configured to, when executed by the controller, cause the autonomous driving control apparatus to, when the host vehicle is traveling at a crossroads, identify the image change rate for a road above a center line among the roads in the image identified by use of the specified security mirror, identify information about another vehicle in front of the host vehicle using the sensor device, and resume driving the host vehicle, when the image change rate is less than or equal to the specified value during the specified time and when it is determined that it is possible for the host vehicle to travel along the expected driving route based on the information about the other vehicle.

According to an embodiment of the present disclosure, an autonomous driving control method can include identifying, by a controller, a road security mirror being present in front of a host vehicle, using a sensor device, stopping, by the controller, driving the host vehicle, when the road security mirror meets a specified condition, detecting, by the controller, an image change rate of at least one security mirror included in the road security mirror, and resuming, by the controller, driving the host vehicle when the image change rate is less than or equal to a specified value during a specified time.

According to an embodiment, the stopping of the driving of the host vehicle by the controller when the road security mirror meets the specified condition can include determining, by the controller, that the road security mirror meets the specified condition, when the road security mirror is present at the right of a driving direction of the host vehicle or includes two security mirrors.

According to an embodiment, the stopping of the driving of the host vehicle by the controller when the road security mirror meets the specified condition can include determining, by the controller, that the road security mirror meets the specified condition, when a horizontal length of the road security mirror is greater than half of a vertical length of the road security mirror when viewed from the host vehicle.

According to an embodiment, the stopping of the driving of the host vehicle by the controller when the road security mirror meets the specified condition can include determining, by the controller, that the road security mirror does not meet the specified condition, when it is identified that the road security mirror is present in an area within a specified angle with respect to a real-time driving direction of the host vehicle.

According to an embodiment, the stopping of the driving of the host vehicle by the controller when the road security mirror meets the specified condition can include determining, by the controller, that the road security mirror meets the specified condition, when a shortest distance from a furthest road line from the host vehicle among horizontal lines at an intersection being present in front of the host vehicle to the road security mirror is within a specified range.

According to an embodiment, the stopping of the driving of the host vehicle by the controller when the road security mirror meets the specified condition can include determining, by the controller, that the road security mirror meets the specified condition, when a vertical length of the road security mirror corresponds to a specified length.

According to an embodiment, the autonomous driving control method can further include identifying, by the controller, an expected driving route of the host vehicle, identifying, by the controller, a specified security mirror among the at least one security mirror of the road security mirror, based on the expected driving route, and determining, by the controller, at least one road to identify the image change rate among roads in an image identified by use of the specified security mirror, based on the expected driving route.

According to an embodiment, the determining of the least one road to identify the image change rate among the roads in the image identified by use of the specified security mirror based on the expected driving route by the controller can include, when the host vehicle is traveling at a T-shaped intersection, identifying, by the controller, a left security mirror among the at least one security mirror of the road security mirror as the specified security mirror, when the expected driving route of the host vehicle corresponds to a right turn, and identifying, by the controller, the image change rate for a road above a center line among the roads in the image identified by use of the left security mirror.

According to an embodiment, the determining of the least one road to identify the image change rate among the roads in the image identified by use of the specified security mirror based on the expected driving route by the controller can include, when the host vehicle is traveling at a T-shaped intersection, identifying, by the controller, a left security mirror and a right security mirror among the at least one security mirror of the road security mirror as the specified security mirror, when the expected driving route of the host vehicle corresponds to a left turn, identifying, by the controller, the image change rate for a road above a first center line among the roads in the image identified by use of the left security mirror, and identifying, by the controller, the image change rate for a road below a second center line among the roads in the image identified by use of the right security mirror.

According to an embodiment, the determining of the least one road to identify the image change rate among the roads in the image identified by use of the specified security mirror based on the expected driving route by the controller can include, when the host vehicle is traveling at a crossroads, identifying, by the controller, the image change rate for a road above a center line among the roads in the image identified by use of the specified security mirror, identifying, by the controller, information about another vehicle in front of the host vehicle using the sensor device and resuming, by the controller, driving the host vehicle, when the image change rate is less than or equal to the specified value during the specified time and when it is determined that it is possible for the host vehicle to travel along the expected driving route based on whether there is the other vehicle.

BRIEF DESCRIPTION OF THE DRAWINGS

The above and other features and advantages of embodiments of the present disclosure can be more apparent from the following detailed description taken in conjunction with the accompanying drawings.

DETAILED DESCRIPTION OF ILLUSTRATIVE EMBODIMENTS

Figure 1:
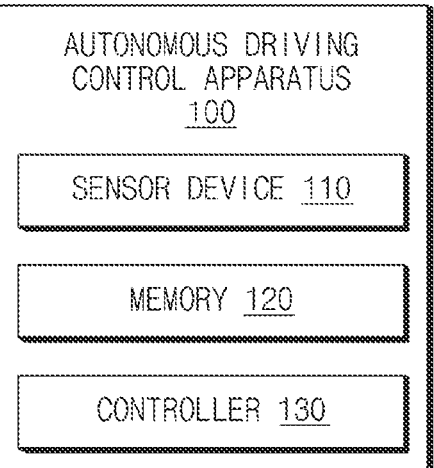
FIG. 1 is a block diagram illustrating components of an autonomous driving control apparatus according to an embodiment of the present disclosure.

Hereinafter, some embodiments of the present disclosure will be described in detail with reference to the exemplary drawings. In the drawings, the same reference numerals can be used throughout to designate the same or equivalent elements. With regard to description of drawings, the same or similar denotations can be used for the same or similar components. In addition, a detailed description of well-known features or functions can be omitted to not unnecessarily obscure the gist of embodiments of the present disclosure.

In describing the components of an embodiment of the present disclosure, terms such as first, second, "A", "B", (a), (b), and the like can be used. These terms may be only used to distinguish one element from another element, but do not necessarily limit the corresponding elements irrespective of the order or priority of the corresponding elements. Furthermore, unless otherwise defined, all terms including technical and scientific terms used herein can be interpreted as is customary in the art to which embodiments of the present disclosure pertain. It can be understood that terms used herein can be interpreted as having a meaning that is consistent with their meaning in the context of this disclosure and the relevant art.

Hereinafter, embodiments of the present disclosure will be described in detail with reference to FIGS. 1 to 10.

FIG. 1 is a block diagram illustrating components of an autonomous driving control apparatus according to an embodiment of the present disclosure.

According to an embodiment, an autonomous driving control apparatus 100 can include a sensor device 110, a memory 120, a controller 130, or any combination thereof. The components of the autonomous driving control apparatus 100, which are shown in FIG. 1, are illustrative, and embodiments of the present disclosure are not necessarily limited thereto. For example, the autonomous driving control apparatus 100 can further include components (e.g., an output device, a communication device, a driving device, an input device, an interface, or any combination thereof) which are not shown in FIG. 1.

According to an embodiment, the sensor device 110 can obtain (or sense) various pieces of information used for driving of a vehicle.

For example, the sensor device 110 can include many devices, such as at least one sensor including a camera, radar, light detection and ranging (LiDAR), or any combination thereof.

For example, the sensor device 110 can obtain information about an external object (e.g., a person, another vehicle, a building, a structure, or any combination thereof), using the at least one sensor.

For example, the sensor device 110 can obtain information about whether there is another vehicle and/or a driving state of the other vehicle (e.g., a driving speed of the host vehicle, a driving direction of the host vehicle, a separation distance from the host vehicle, whether the host vehicle is stopped, or any combination thereof).

For example, the sensor device 110 can obtain data (e.g., sensor fusion data) by use of a sensor set including at least one sensor. As an example, the sensor device 110 can include a plurality of sensor sets for respectively obtaining pieces of data for a plurality of areas logically and/or physically divided.

According to an embodiment, the memory 120 can store a command and/or data. For example, the memory 120 can store one or more instructions, when executed by the controller 130, causing the autonomous driving control apparatus 100 to perform various operations.

For example, the memory 120 and the controller 130 can be implemented as one chipset. The controller 130 can include a communication processor and/or a modem.

As an example, the memory 120 can store information about states and/or operations of components (e.g., an engine control unit (ECU), the sensor device 110, the controller 130, or any combination thereof) of the host vehicle.

For example, the memory 120 can store various pieces of information associated with the autonomous driving control apparatus 100. As an example, the memory 120 can store information about an operation history of the controller 130.

According to an embodiment, the controller 130 can be operatively connected with the sensor device 110 and/or the memory 120. For example, the controller 130 can control operations of the sensor device 110 and/or the memory 120.

For example, the controller 130 can identify (or detect) various structures which are present in front of the host vehicle using the sensor device 110.

As an example, the controller 130 can identify at least one road security mirror which is present in front of the host vehicle using the sensor device 110. The road security mirror can include, for example, at least one security mirror (or mirror) and can include a structure located on a specified type of road (e.g., an intersection).

For example, the controller 130 can determine whether the identified road security mirror meets a specified condition.

As an example, the controller 130 can identify whether the road security mirror is present in any direction with respect to the driving direction of the host vehicle.

As an example, the controller 130 can identify the number of security mirrors included in the road security mirror.

As an example, the controller 130 can identify whether the road security mirror is present in an area within a specified angle on the basis of a horizontal length of the road security mirror, a vertical length of the road security mirror, a height of the road security mirror, a rate of the road security mirror, a shape of the road security mirror, and a direction (or a real-time driving direction) the host vehicle faces.

For example, when the road security mirror is present at the right of the driving direction of the host vehicle or includes two security mirrors, the controller 130 can determine that the road security mirror meets the specified condition.

As an example, when the road security mirror is present at the right of the driving direction of the host vehicle, the controller 130 can identify that the host vehicle is traveling at a T-shaped intersection and can determine that the road security mirror meets the specified condition.

As an example, when it is identified that the road security mirror includes two security mirrors, the controller 130 can identify that the host vehicle is traveling at a crossroads and can determine that the road security mirror meets the specified condition.

For example, when the horizontal length of the road security mirror is greater than half the vertical length of the road security mirror when viewed from the host vehicle, the controller 130 can determine that the road security mirror meets the specified condition.

As an example, when the horizontal length of an image corresponding to the road security mirror, which is obtained by use of the sensor device 110 (or a camera), is greater than half the vertical length of the image, the controller 130 can expect that the accuracy of data to be obtained by use of the road security mirror will be high and can determine that the road security mirror meets the specified condition.

For example, when it is identified that the road security mirror is present in the area within the specified angle (e.g., 45 degrees) with respect to the real-time driving direction of the host vehicle, the controller 130 can determine that the road security mirror does not meet a specified condition.

As an example, when the location of the security mirror obtained by use of the sensor device 110 is present in the area within the specified angle with respect to the driving direction of the host vehicle, the controller 130 can expect that the accuracy of data to be obtained by use of the road security mirror can be low and can determine that the road security mirror does not meet a specified condition.

For example, when the shortest distance from the furthest road line from the host vehicle among horizontal lines at the intersection in front of the host vehicle to the road security mirror is within a specified range (e.g., 1.8 m to 2.5 m), the controller 130 can determine that the road security mirror meets a specified condition.

As an example, when the height at which the road security mirror is installed is included in the specified range, the controller 130 can expect that the accuracy of data to be obtained by use of the road security mirror can be high and can determine that the road security mirror meets a specified condition.

For example, when the vertical length of the road security mirror corresponds to a specified length (e.g., at least one of 60 cm, 80 cm, 100 cm, or any value therebetween), the controller 130 can determine that the road security mirror meets a specified condition.

In an embodiment, only when the above-mentioned road security mirror meets all the specified conditions about the above-mentioned road security mirror, the controller 130 can detect an image change rate of the at least one security mirror included in the road security mirror.

In an embodiment, even when the above-mentioned road security mirror meets only some of the specified conditions about the above-mentioned road security mirror, the controller 130 can detect an image change rate of the at least one security mirror included in the road security mirror.

For example, when the road security mirror meets a specified condition, the controller 130 can stop driving the host vehicle.

For example, after first stopping driving the host vehicle when the road security mirror meets the specified condition, the controller 130 can detect an image change rate of the at least one security mirror included in the road security mirror by use of the sensor device 110.

For example, the controller 130 can identify a specified security mirror among the at least one security mirror of the road security mirror based on at least one of an expected driving route of the host vehicle, a driving road type of the host vehicle, or any combination thereof.

For example, the controller 130 can determine at least one road to identify an image change rate among roads in the image identified by use of the specified security mirror, based on the expected driving route.

As an example, when the host vehicle is traveling at the T-shaped intersection and when the expected driving route of the host vehicle corresponds to a right turn, the controller 130 can identify a left security mirror among the at least one security mirror of the road security mirror as the specified security mirror. In this case, the controller 130 can identify an image change rate for a road above the center line among the roads in the image identified by use of the left security mirror. In other words, the controller 130 can identify an image change rate for a road (or a line) provided to go straight in a right direction from the left when viewed from the host vehicle, using the image obtained by use of the left security mirror.

As an example, when the host vehicle is traveling at the T-shaped intersection and when the expected driving route of the host vehicle corresponds to a left turn, the controller 130 can identify the left security mirror and a right security mirror among the at least one security mirror of the road security mirror as the specified security mirror. In this case, the controller 130 can identify an image change rate for a road above a first center line among the roads in the image identified by use of the left security mirror. In other words, the controller 130 can identify an image change rate for a road (or a line) provided to go straight in a right direction from the left when viewed from the host vehicle, using the image obtained by use of the left security mirror. Furthermore, the controller 130 can identify an image change rate for a road below a second center line among the roads in the image identified by use of the right security mirror. In other words, the controller 130 can identify an image change rate for a road (or a line) provided to go straight in a left direction from the right when viewed from the host vehicle, using the image obtained by use of the right security mirror.

As an example, when the host vehicle is traveling at a crossroads, the controller 130 can identify a road security mirror meeting the specified condition as the specified security mirror regardless of the expected driving route of the host vehicle. In this case, the controller 130 can identify an image change rate for the road above the center line among the roads in the image identified by use of the specified security mirror. In other words, the controller 130 can identify an image change rate for a road (or a line) provided to go straight in a right direction from the left when viewed from the host vehicle, using the image obtained by use of the specified security mirror.

For example, the controller 130 can determine whether to resume driving the host vehicle, further using various pieces of data obtained using the sensor device 110.

As an example, the controller 130 can identify information about another vehicle in an area adjacent to the host vehicle using the sensor device 110 and can determine whether to resume driving the host vehicle, further using the information about the other vehicle.

As an example, the controller 130 can further identify whether there is another vehicle in front of the host vehicle, a driving speed of the other vehicle, an expected driving direction of the other vehicle, or any combination thereof, further using a camera, radar, LiDAR, or any combination thereof, and can resume driving the host vehicle when it is determined that it is possible for the host vehicle to safely travel along the expected driving route based on the identified result and the image change rate.

Figure 2:
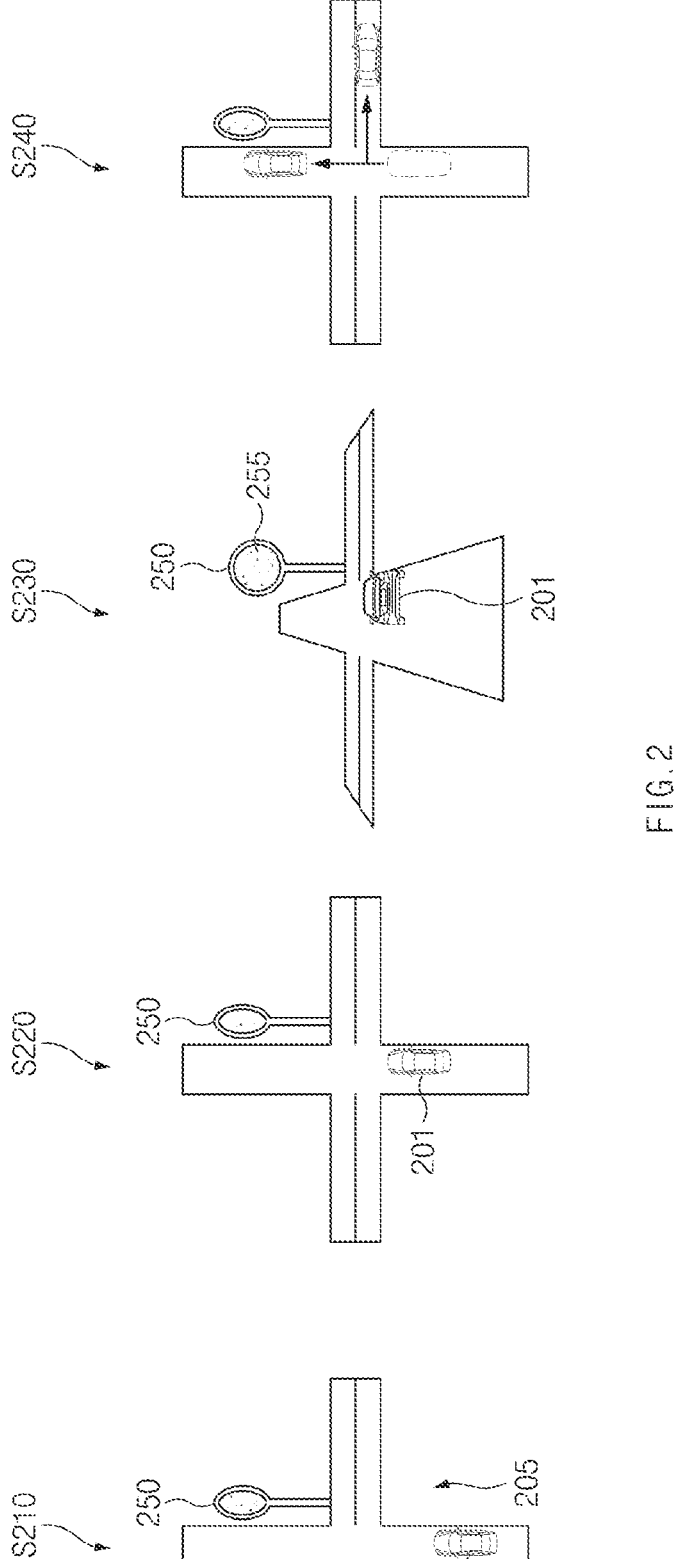
FIG. 2 is an operational conceptual diagram of an autonomous driving control apparatus according to an embodiment of the present disclosure.

FIG. 2 is an operational conceptual diagram of an autonomous driving control apparatus according to an embodiment of the present disclosure.

Referring to reference numeral S210, according to an embodiment, an autonomous driving control apparatus (e.g., an autonomous driving control apparatus 100 of FIG. 1) can identify a road security mirror 250 which is present in front of a host vehicle 201.

As an example, the autonomous driving control apparatus can identify the at least one road security mirror 250 which is present in a driving direction 205 (or in front of) the host vehicle 201, using a sensor device (e.g., a sensor device 110 of FIG. 1). The road security mirror 250 can include, for example, at least one security mirror (or mirror).

For example, the autonomous driving control apparatus can determine whether the road security mirror 250 meets a specified condition.

As an example, when the road security mirror 250 is present at the right of the driving direction 205 of the host vehicle 201 or includes two security mirrors, the autonomous driving control apparatus can determine that the road security mirror 250 meets a specified condition.

As an example, when the horizontal length of the road security mirror 250 is greater than half the vertical length of the road security mirror 250 when viewed from the host vehicle 201, the autonomous driving control apparatus can determine that the road security mirror 250 meets the specified condition.

As an example, when it is identified that the road security mirror 250 is present in an area within a specified angle (e.g., 45 degrees) with respect to the real-time driving direction 205 of the host vehicle 201, the autonomous driving control apparatus can determine that the road security mirror 250 does not meet the specified condition.

As an example, when the shortest distance from the furthest road line from the host vehicle 201 among horizontal lines at an intersection which is present in front of the host vehicle 201 to the road security mirror 250 is within a specified range, the autonomous driving control apparatus can determine that the road security mirror 250 meets the specified condition.

As an example, when the vertical length of the road security mirror 250 corresponds to a specified condition, the autonomous driving control apparatus can determine that the road security mirror 250 meets the specified condition.

Referring to reference numeral S220, according to an embodiment, when the road security mirror 250 meets the specified condition, the autonomous driving control apparatus can stop driving forward the host vehicle 201 (e.g., reduce speed of the host vehicle 201 and/or bring the host vehicle 201 to a stop).

For example, according to reference numeral S220, the autonomous driving control apparatus can stop driving forward the host vehicle 201 before the host vehicle 201 enters an intersection and can detect (or identify) a range of change in an image included in the road security mirror 250 using the sensor device.

Referring to reference numeral S230, according to an embodiment, the autonomous driving control apparatus can detect an image change rate of at least one security mirror 255 included in the road security mirror 250.

For example, the autonomous driving control apparatus can determine whether the image change rate of the at least one security mirror 255 is less than or equal to a specified value during a specified time.

Referring to reference numeral S240, according to an embodiment, when the image change rate is less than or equal to the specified value during the specified time, the autonomous driving control apparatus can resume driving forward the host vehicle 201.

For example, when detecting that the image change rate is less than or equal to the specified value during the specified time, the autonomous driving control apparatus can continue controlling the driving of the host vehicle 201 along an expected driving direction of the host vehicle 201.

As an example, when the expected driving direction of the host vehicle 201 is a right-turn direction 212, the autonomous driving control apparatus can control the host vehicle 201 to make a right turn.

As an example, when the expected driving direction of the host vehicle 201 is a straight direction 214, the autonomous driving control apparatus can control the host vehicle 201 to go straight.

Figure 3:
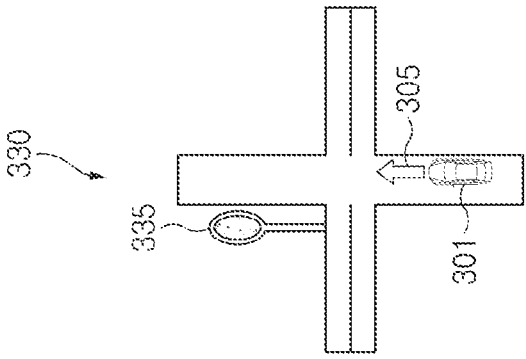
FIG. 3 is a conceptual diagram of an operation where an autonomous driving control apparatus determines whether a road security mirror meets a specified condition according to an embodiment of the present disclosure.
Figure 3:
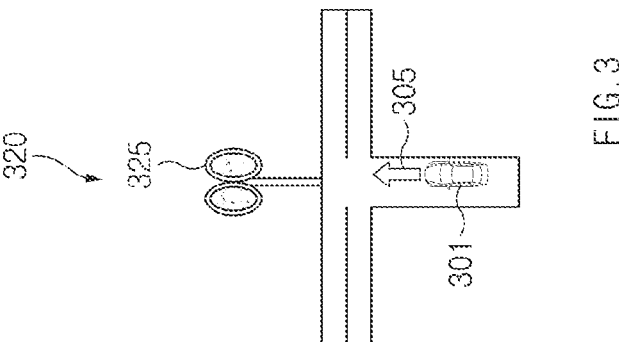
Figure 3:
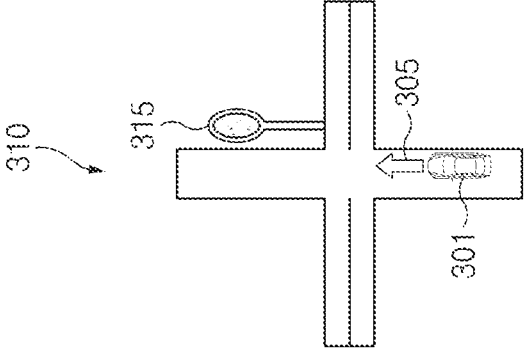

FIG. 3 is a conceptual diagram of an operation where an autonomous driving control apparatus determines whether a road security mirror meets a specified condition according to an embodiment of the present disclosure.

Referring to reference numeral 310, according to an embodiment, an autonomous driving control apparatus (e.g., an autonomous driving control apparatus 100 of FIG. 1) can identify a first road security mirror 315 which is present in one area in front of (or a driving direction 305) of a host vehicle 301 using a sensor device (e.g., a sensor device 110 of FIG. 1).

For example, the autonomous driving control apparatus can identify the first road security mirror 315 is present at the right of the driving direction 305 of the host vehicle 301 and can determine that the first road security mirror 315 meets a specified condition.

Referring to reference numeral 320, according to an embodiment, the autonomous driving control apparatus can identify a second road security mirror 325 which is present in one area in front of (or the driving direction 305) of the host vehicle 301 using the sensor device.

For example, the autonomous driving control apparatus can identify that the second road security mirror 325 includes two security mirrors and can determine that the second road security mirror 325 meets a specified condition.

Referring to reference numeral 330, according to an embodiment, the autonomous driving control apparatus can identify a third road security mirror 335 which is present in one area in front of (or the driving direction 305) of the host vehicle 301 using the sensor device.

For example, the autonomous driving control apparatus can identify that the third road security mirror 335 is present at the left of the driving direction 305 of the host vehicle 301 and can determine that the third road security mirror 335 does not meet a specified condition.

Figure 4:
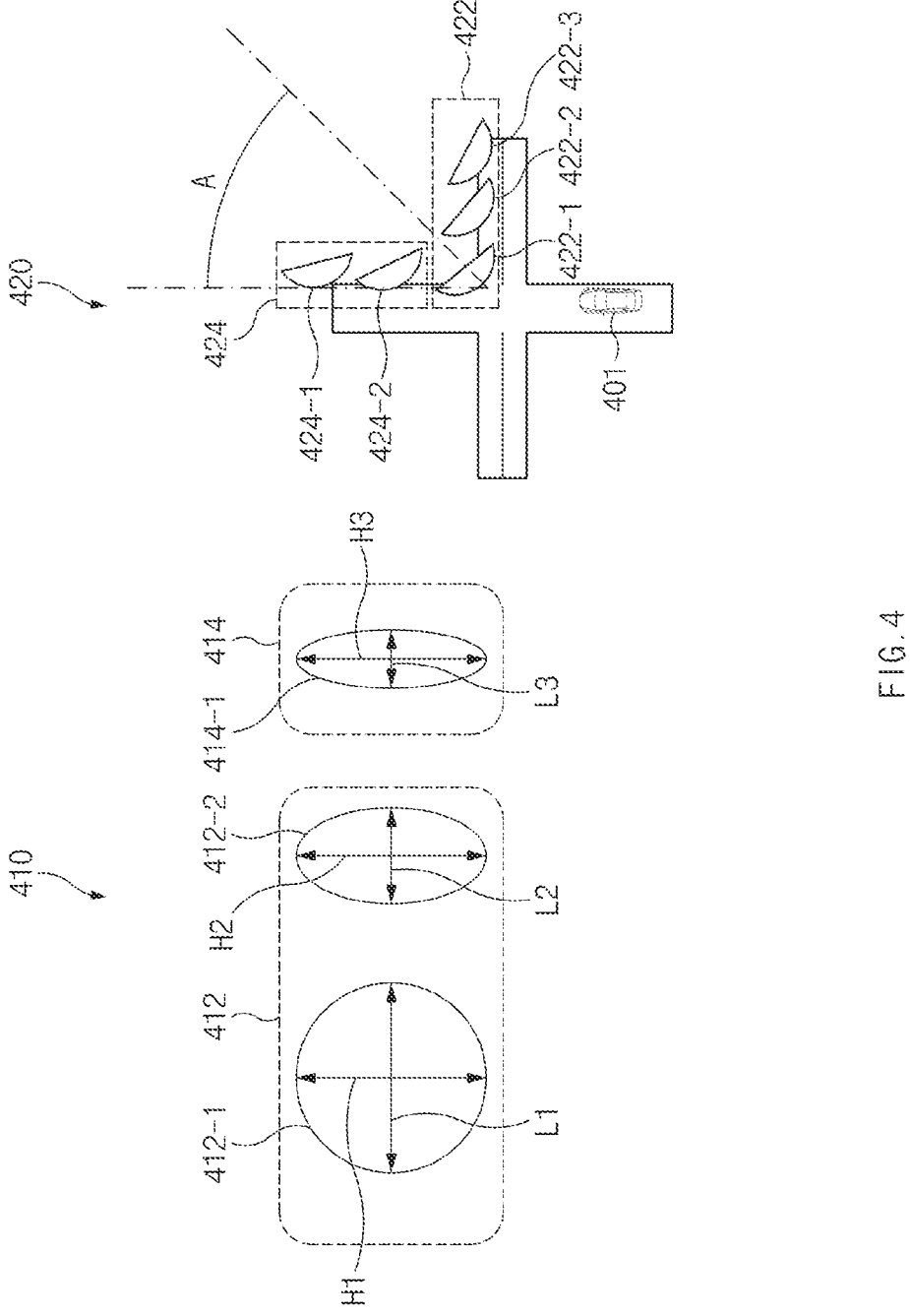
FIG. 4 is a conceptual diagram of an operation where an autonomous driving control apparatus determines whether a road security mirror meets a specified condition according to an embodiment of the present disclosure.

FIG. 4 is a conceptual diagram of an operation where an autonomous driving control apparatus determines whether a road security mirror meets a specified condition according to an embodiment of the present disclosure.

According to an embodiment, reference numeral 410 can be referred to as result data where an autonomous driving control apparatus (e.g., an autonomous driving control apparatus 100 of FIG. 1) identifies a road security mirror which is present in one area in front of (or a driving direction 305) of a host vehicle 401 using a sensor device (e.g., a sensor device 110 of FIG. 1).

For example, the autonomous driving control apparatus can identify a horizontal length, a vertical length, and a rate of a road security mirror based on the result data.

Referring to reference numeral 412, according to an embodiment, the autonomous driving control apparatus can identify that the identified horizontal length of the road security mirror is greater than half the vertical length of the road security mirror and can determine that the road security mirror meets a specified condition.

For example, the autonomous driving control apparatus can identify that the horizontal length L1 of a 1-1st road security mirror 412-1 is greater than half the vertical length H1 of the 1-1st road security mirror 412-1 when viewed from the host vehicle 401 and can determine that the 1-1st road security mirror 412-1 meets a specified condition.

For example, the autonomous driving control apparatus can identify that the horizontal length L2 of a 1-2nd road security mirror 412-2 is greater than half the vertical length H2 of the 1-2nd road security mirror 412-2 when viewed from the host vehicle 401 and can determine that the 1-2nd road security mirror 412-2 meets a specified condition.

Referring to reference numeral 414, according to an embodiment, the autonomous driving control apparatus can identify that the identified horizontal length of the road security mirror is less than or equal to half the vertical length of the road security mirror and can determine that the road security mirror does not meet a specified condition.

For example, the autonomous driving control apparatus can identify that the horizontal length L3 of a 1-3rd road security mirror 414-1 is less than half the vertical length H3 of the 1-3rd road security mirror 414-1 when viewed from the host vehicle 401 and can determine that the 1-3rd road security mirror 414-1 does not meet a specified condition.

According to an embodiment, reference numeral 420 can be referred to as a conceptual diagram where the autonomous driving control apparatus identifies an existence area of the road security mirror which is present in one area in front of (or a driving direction 305) the host vehicle 401 using the sensor device.

For example, the autonomous driving control apparatus can identify an angle range of the existence area of the road security mirror based on the data about the result of identifying the road security mirror using the sensor device.

Referring to reference numeral 422, according to an embodiment, the autonomous driving control apparatus can identify that the identified existence area of the road security mirror includes an area which is greater than a specified range A (e.g., 45 degrees) and can determine that the road security mirror which is present in the area meets a specified condition.

For example, the autonomous driving control apparatus can identify that a 2-1st road security mirror 422-1, a 2-2nd road security mirror 422-2, and a 2-3rd road security mirror 422-3 are present in an area out of the specified angle A with respect to a direction the host vehicle 401 faces when viewed from the host vehicle 401 and can determine that the 2-1st road security mirror 422-1, the 2-2nd road security mirror 422-2, and the 2-3rd road security mirror 422-3 meet a specified condition.

Referring to reference numeral 424, according to an embodiment, the autonomous driving control apparatus can identify that the identified existence area of the road security mirror includes an area within the specified range A (e.g., 45 degrees) and can determine that the road security mirror which is present in the area does not meet a specified condition.

For example, the autonomous driving control apparatus can identify that a 2-4th road security mirror 424-1 and a 2-5th road security mirror 424-2 are present in an area within the specified angle A with respect to a direction the host vehicle 401 faces when viewed from the host vehicle 401 and can determine that the 2-4th road security mirror 424-1 and the 2-5th road security mirror 424-2 meet a specified condition.

Figure 5:
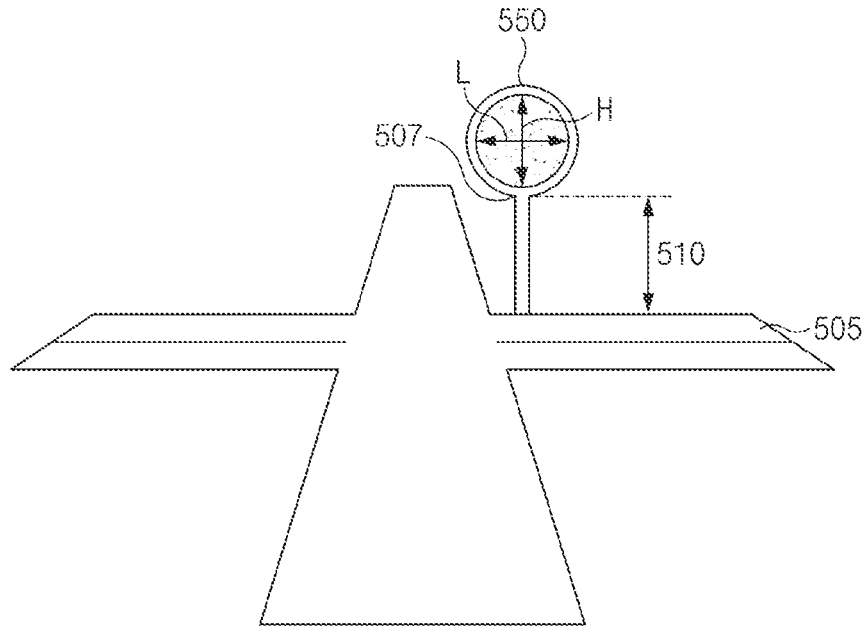
FIG. 5 is a conceptual diagram of an operation where an autonomous driving control apparatus determines whether a road security mirror meets a specified condition according to an embodiment of the present disclosure.

FIG. 5 is a conceptual diagram of an operation where an autonomous driving control apparatus determines whether a road security mirror meets a specified condition according to an embodiment of the present disclosure.

According to an embodiment, an autonomous driving control apparatus (e.g., an autonomous driving control apparatus 100 of FIG. 1) can identify a horizontal length L of a road security mirror 550 which is present in one area in front of a host vehicle, a vertical length H of the road security mirror 550, a height 510 of the road security mirror 550, or any combination thereof using a sensor device (e.g., a sensor device 110 of FIG. 1).

For example, the autonomous driving control apparatus can identify the height 510 which is the shortest distance from a road line of the furthest road 505 from the host vehicle among horizontal lines at an intersection which is present in front of the host vehicle to the road security mirror 550.

As an example, the height 510 of the road security mirror 550 can be a length from one point of a road line corresponding to a pillar of the road security mirror 550 among road lines of the furthest road 505 to one point 507 corresponding to the shortest distance to the road security mirror 550.

According to an embodiment, when the shortest distance from the road line of the furthest road 505 from the host vehicle among the horizontal lines at the intersection which is present in front of the host vehicle to the road security mirror 550 is within a specified range, the autonomous driving control apparatus can determine that the road security mirror 550 meets a specified condition.

According to an embodiment, when the horizontal length L of the road security mirror 550 is greater than half the vertical length H of the road security mirror 550 in the image where the road security mirror 550 is identified, the autonomous driving control apparatus can determine that the road security mirror 550 meets a specified condition.

Figure 6:
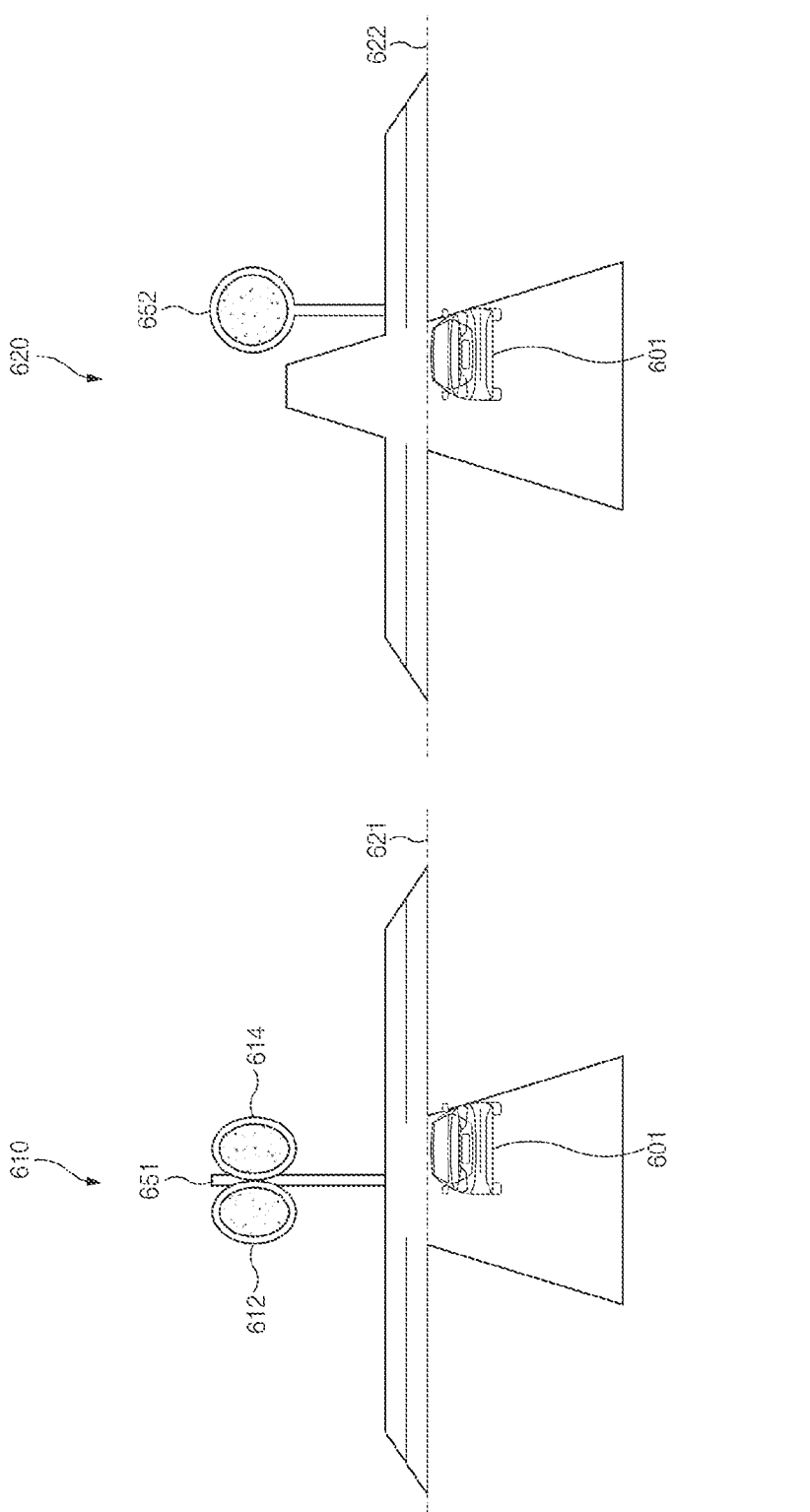
FIG. 6 is an operational conceptual diagram illustrating an operation where an autonomous driving control apparatus stops driving a host vehicle according to an embodiment of the present disclosure.

FIG. 6 is an operational conceptual diagram illustrating an operation where an autonomous driving control apparatus stops driving a host vehicle according to an embodiment of the present disclosure.

Referring to reference numeral 610, according to an embodiment, an autonomous driving control apparatus (e.g., an autonomous driving control apparatus 100 of FIG. 1) can stop driving forward a host vehicle 601 based on the result of identifying a first road security mirror 651 at a T-shaped intersection.

For example, when identifying the first road security mirror 651 which is present in one area in front of the host vehicle 601 and identifying that the first road security mirror 651 includes two security mirrors 612 and 614, the autonomous driving control apparatus can determine that the first road security mirror 651 meets a specified condition.

For example, when the horizontal length of each of the two security mirrors 612 and 614 included in the first road security mirror 651 is greater than half the vertical length of each of the two security mirrors 612 and 614, the autonomous driving control apparatus can determine that the first road security mirror 651 meets a specified condition.

For example, when the height of the first road security mirror 651 is included in a specified range and when the vertical length of each of the two security mirrors 612 and 614 included in the first road security mirror 651 corresponds to a specified length, the autonomous driving control apparatus can determine that the first road security mirror 651 meets a specified condition.

For example, when the first road security mirror 651 meets a specified condition, the autonomous driving control apparatus can stop driving forward the host vehicle 601. As an example, the autonomous driving control apparatus can stop driving the host vehicle 601 before a T-shaped intersection entry line 621.

Referring to reference numeral 620, according to an embodiment, the autonomous driving control apparatus can stop driving forward the host vehicle 601 based on the result of identifying a second road security mirror 652 at a crossroads.

For example, when identifying the second road security mirror 652 which is present in one area in front of the host vehicle 601 and identifying that the second road security mirror 652 is present at the right of a driving direction of the host vehicle 601, the autonomous driving control apparatus can determine that the second road security mirror 652 meets a specified condition.

For example, when the horizontal length of at least one security mirror included in the second road security mirror 652 is greater than half the vertical length of the at least one security mirror, the autonomous driving control apparatus can determine that the second road security mirror 652 meets a specified condition.

For example, when the height of the second road security mirror 652 is included in a specified range and when the vertical length of the at least one security mirror included in the second road security mirror 652 corresponds to a specified length, the autonomous driving control apparatus can determine that the second road security mirror 652 meets a specified condition.

For example, when the second road security mirror 652 meets the specified condition, the autonomous driving control apparatus can stop driving forward the host vehicle 601. As an example, the autonomous driving control apparatus can stop driving forward the host vehicle 601 before a crossroads entry line 622.

Figure 7:
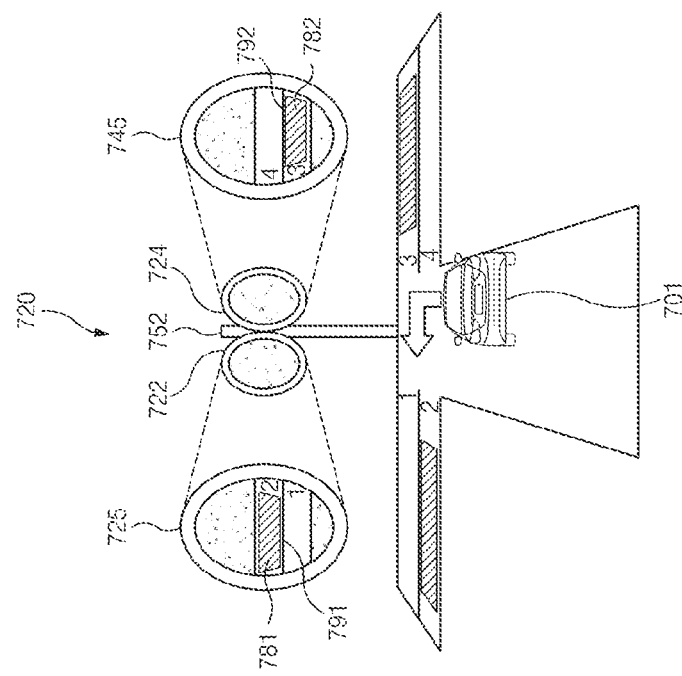
FIG. 7 is a conceptual diagram of an operation where an autonomous driving control apparatus controls a host vehicle at a T-shaped intersection according to an embodiment of the present disclosure.
Figure 7:
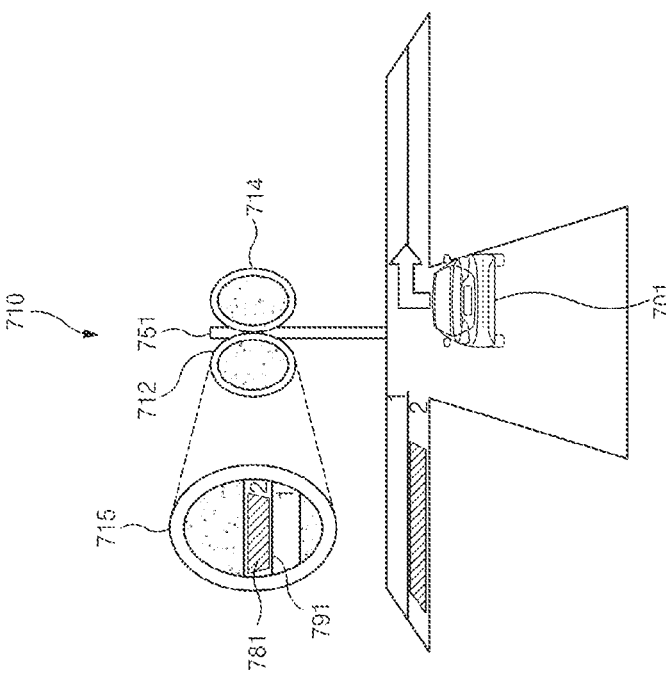

FIG. 7 is a conceptual diagram of an operation where an autonomous driving control apparatus controls a host vehicle at a T-shaped intersection according to an embodiment of the present disclosure.

According to an embodiment, based on an expected driving route (or direction) of a host vehicle 701, an autonomous driving control apparatus (e.g., an autonomous driving control apparatus 100 of FIG. 1) can identify a specified security mirror and can determine at least one of a plurality of roads in an image obtained by use of the specified security mirror as a road to identify an image change rate.

Referring to reference numeral 710, according to an embodiment, while controlling the host vehicle 701 to a T-shaped intersection, the autonomous driving control apparatus can identify a first road security mirror 751 which is present in a portion of an area in front of the host vehicle 701 using a sensor device (e.g., a sensor device 110 of FIG. 1).

For example, the autonomous driving control apparatus can identify an expected driving route of the host vehicle 701 corresponds to a right turn and can identify a left security mirror 712 between at least one security mirror 712 and 714 included in the first road security mirror 751 as the specified security mirror.

For example, the autonomous driving control apparatus can identify an image change rate for a road (e.g., No. 2 road) above a center line 791 among roads (e.g., No. 1 road and No. 2 road) in an image 715 identified by use of the left security mirror 712. As an example, the autonomous driving control apparatus can identify an image change rate for one area 781 of No. 2 road.

Referring to reference numeral 720, according to an embodiment, while controlling the host vehicle 701 to the T-shaped intersection, the autonomous driving control apparatus can identify a second road security mirror 752 which is present in a portion of an area in front of the host vehicle 701 using the sensor device.

For example, the autonomous driving control apparatus can identify an expected driving route of the host vehicle 701 corresponds to a left turn and can identify a left security mirror 722 and a right security mirror 724 (i.e., all the at least one security mirror 722 and 724 included in the second road security mirror 752) between the at least one security mirror 722 and 724 as the specified security mirror.

For example, the autonomous driving control apparatus can identify an image change rate for a road (e.g., No. 2 road) above a center line 791 among roads (e.g., No. 1 road and No. 2 road) in an image 725 identified by use of the left security mirror 722. As an example, the autonomous driving control apparatus can identify an image change rate for one area 781 of No. 2 road.

For example, the autonomous driving control apparatus can identify an image change rate for a road (e.g., No. 3 road) below a center line 792 among roads (e.g., No. 3 road and No. 4 road) in an image 745 identified by use of the right security mirror 724. As an example, the autonomous driving control apparatus can identify an image change rate for one area 782 of No. 3 road.

Figure 8:
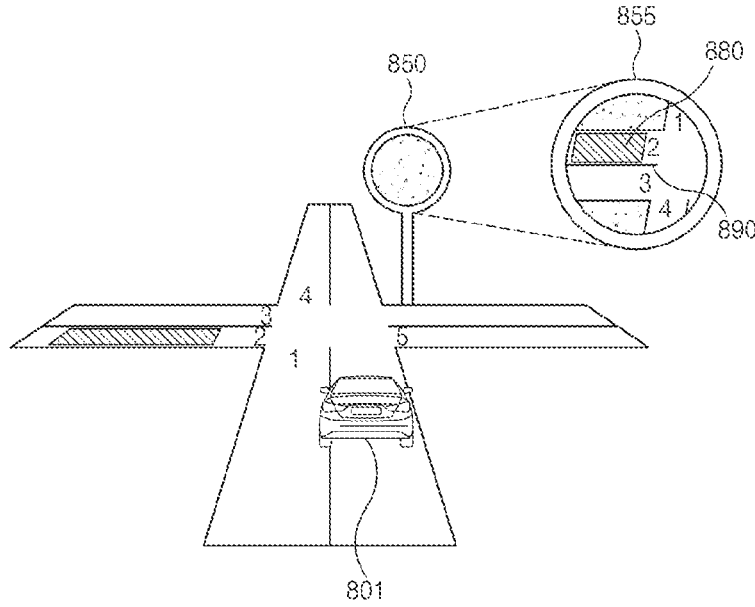
FIG. 8 is a conceptual diagram of an operation where an autonomous driving control apparatus controls a host vehicle at a crossroads according to an embodiment of the present disclosure.

FIG. 8 is a conceptual diagram of an operation where an autonomous driving control apparatus controls a host vehicle at a crossroads according to an embodiment of the present disclosure.

According to an embodiment, while controlling a host vehicle 801 to a crossroads, an autonomous driving control apparatus (e.g., an autonomous driving control apparatus 100 of FIG. 1) can identify a road security mirror 850 which is present in a portion of an area in front of the host vehicle 801 using a sensor device (e.g., a sensor device 110 of FIG. 1).

For example, when the host vehicle 801 is traveling at the crossroads, the autonomous driving control apparatus can identify at least one security mirror of the road security mirror 850 as a specified security mirror. As an example, the road security mirror 850 includes one security mirror at the crossroads. Thus, the autonomous driving control apparatus can identify the one security mirror as the specified security mirror.

For example, the autonomous driving control apparatus can identify an image change rate for a road (e.g., No. 2 road) above a center line 890 among roads (e.g., No. 1 road, No. 2 road, No. 3 road, and No. 4 road) in an image 855 identified by use of the specified security mirror, regardless a driving direction of the host vehicle 801, at the crossroads. As an example, the autonomous driving control apparatus can identify an image change rate for one area 880 of No. 2 road.

For example, when identifying an expected driving route of the host vehicle 801 corresponds to a right turn at the crossroads, the autonomous driving control apparatus can determine whether to resume driving the host vehicle 801 using the image change rate for No. 2 road.

For example, when identifying the expected driving route of the host vehicle 801 corresponds to a left turn at the crossroads, the autonomous driving control apparatus can determine whether to resume driving the host vehicle 801 further using the image change rate for No. 2 road, the image change rate for No. 5 road, and sensing information about No. 4 road. Regarding No. 4 road, the autonomous driving control apparatus can collect and obtain information by use of, for example, the sensor device rather than the road security mirror 850.

For example, when identifying the expected driving route of the host vehicle 801 corresponds to a straight route at the crossroads, the autonomous driving control apparatus can determine whether to resume driving forward the host vehicle 801 further using the image change rate for No. 5 road together with the image change rate for No. 2 road. Regarding No. 5 road, the autonomous driving control apparatus can collect and obtain information by use of, for example, the sensor device rather than the road security mirror 850.

For example, the autonomous driving control apparatus can further obtain information about No. 4 road among the plurality of roads shown in FIG. 8 by use of the sensor device and can determine whether to resume driving the host vehicle 801 using the obtained information.

As an example, the autonomous driving control apparatus can identify information about another vehicle in front of the host vehicle 801 using the sensor device. The front can include, for example, No. 4 road included in some of the roads in front of the host vehicle 801. Because the information about No. 4 road has a high probability that information obtained using at least one sensor included in the sensor device will have relatively higher accuracy than information obtained by use of the road security mirror 850, the autonomous driving control apparatus can obtain the information about No. 4 road by use of the sensor device.

Figure 9:
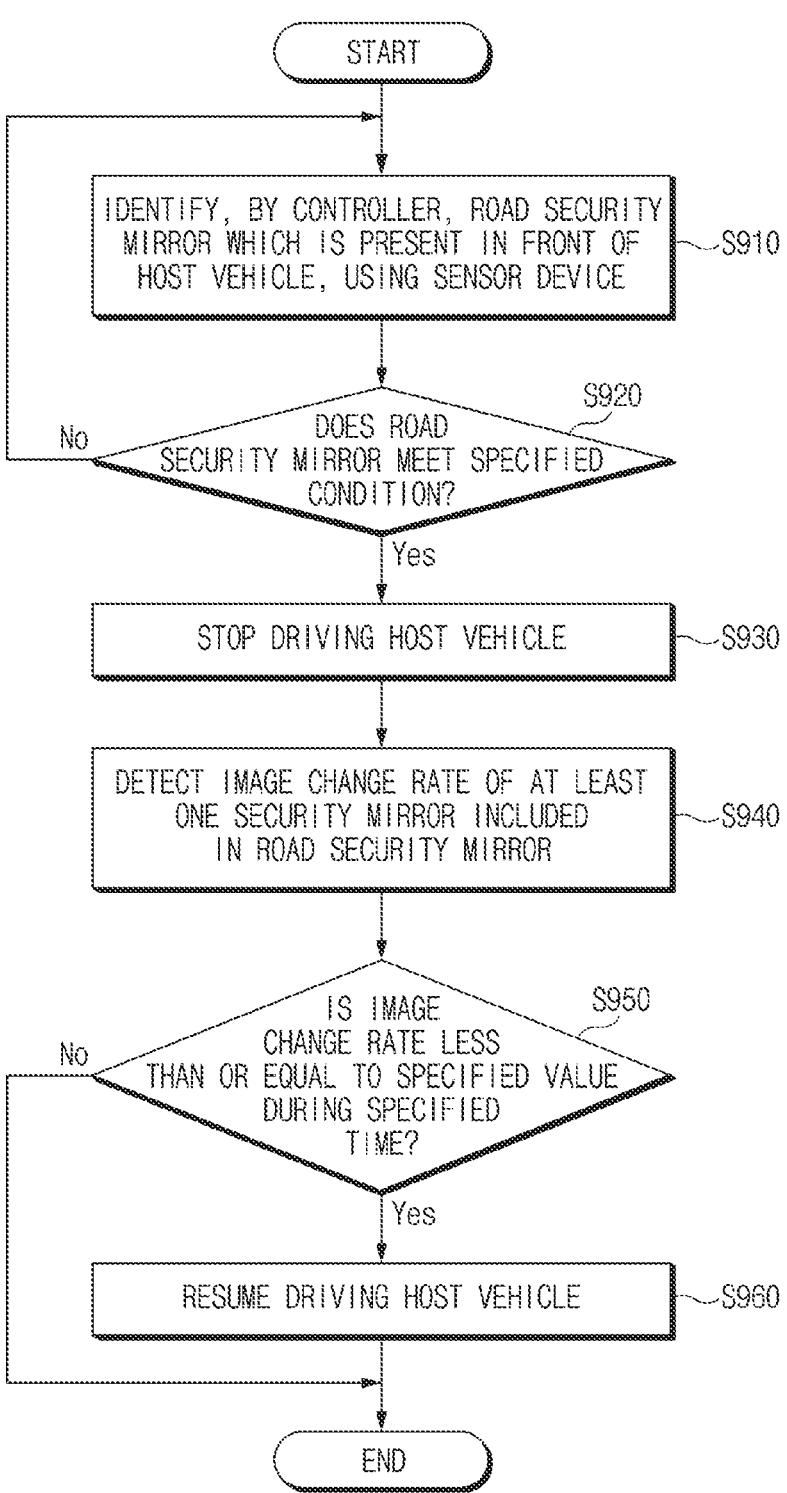
FIG. 9 is an operational flowchart of an autonomous driving control apparatus according to an embodiment of the present disclosure.

FIG. 9 is an operational flowchart of an autonomous driving control apparatus according to an embodiment of the present disclosure.

According to an embodiment, the autonomous driving control apparatus (e.g., an autonomous driving control apparatus 100 of FIG. 1) can perform operations disclosed in FIG. 9. For example, at least some of components (e.g., a sensor device 110 of FIG. 1, a memory 120 of FIG. 1, a controller 130 of FIG. 1, or any combination thereof) included in the autonomous driving control apparatus 100 can be configured to perform the operations of FIG. 9.

Operations in S910 to S960 in an embodiment below can be sequentially performed, but are not necessarily sequentially performed. For example, an order of the respective operations can be changed, and two or more operations can be performed in parallel. Furthermore, contents, which correspond to or are duplicated with the contents described above in conjunction with FIG. 9, may be briefly described or omitted.

According to an embodiment, in operation S910, the autonomous driving control apparatus can identify a road security mirror which is present in front of a host vehicle, using a sensor device included in the autonomous driving control apparatus.

According to an embodiment, in operation S920, the autonomous driving control apparatus can identify whether the road security mirror meets a specified condition.

For example, when the road security mirror is present at the right of the driving direction of the host vehicle or includes two security mirrors, the autonomous driving control can determine that the road security mirror meets a specified condition.

For example, when the horizontal length of the road security mirror is greater than half the vertical length of the road security mirror when viewed from the host vehicle, the autonomous driving control can determine that the road security mirror meets a specified condition.

For example, when it is identified that the road security mirror is present in an area within a specified angle with respect to a real-time driving direction of the host vehicle, the autonomous driving control can determine that the road security mirror does not meet a specified condition.

For example, when the shortest distance from the furthest road line from the host vehicle among horizontal lines at an intersection which is present in front of the host vehicle to the road security mirror (or an installation height from the ground of the road security mirror) is within a specified range, the autonomous driving control apparatus can determine that the road security mirror meets a specified condition.

For example, when the vertical length of the road security mirror corresponds to a specified length, the autonomous driving control apparatus can determine that the road security mirror meets a specified condition.

For example, when the road security mirror meets the specified condition (e.g., operation S920=Yes), the autonomous driving control apparatus can perform operation S930.

For example, when the road security mirror does not meet a specified condition (e.g., operation S920=No), the autonomous driving control apparatus can perform operation S910 again.

According to an embodiment, in operation S930, the autonomous driving control apparatus can stop driving forward the host vehicle.

For example, the autonomous driving control apparatus can stop driving forward the host vehicle before the host vehicle passes through an intersection entry line.

According to an embodiment, in operation S940, the autonomous driving control apparatus can detect an image change rate of at least one security mirror included in the road security mirror.

For example, the autonomous driving control apparatus can continue monitoring an image included in the road security mirror and can detect an image change rate based on the monitored result.

According to an embodiment, in operation S950, the autonomous driving control apparatus can determine whether the image change rate is less than or equal to a specified value during a specified time.

For example, when the image change rate is less than or equal to the specified value during the specified time (e.g., operation S950=Yes), the autonomous driving control apparatus can perform operation S960.

For example, when the image change rate is greater than the specified value during the specified time (e.g., operation S950=No), the autonomous driving control apparatus can perform another operation (e.g., keeping the host vehicle stopped).

According to an embodiment, in operation S960, the autonomous driving control apparatus can resume driving the host vehicle.

For example, the autonomous driving control apparatus can continue controlling the host vehicle based on an expected driving direction.

Figure 10:
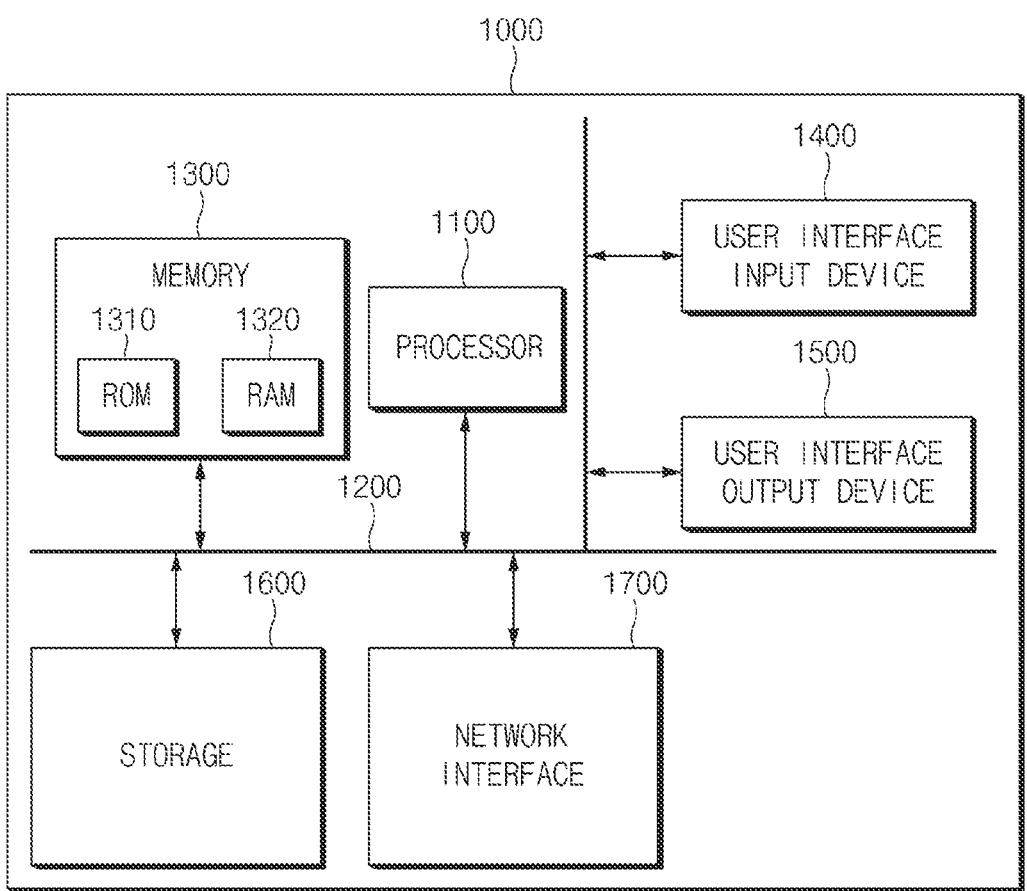
FIG. 10 illustrates a computing system about an autonomous driving control method according to an embodiment of the present disclosure.

FIG. 10 illustrates a computing system 1000 that can be used to perform an autonomous driving control method according to an embodiment of the present disclosure.

Referring to FIG. 10, a computing system 1000 can include at least one processor 1100, a memory 1300, a user interface input device 1400, a user interface output device 1500, storage 1600, and a network interface 1700, which are connected with each other via a bus 1200.

The processor 1100 can be a central processing unit(s) (CPU) or a semiconductor device(s) that processes instructions stored in the memory 1300 and/or the storage 1600. The memory 1300 and the storage 1600 can include various types of volatile or non-volatile storage media. For example, the memory 1300 can include a ROM (Read Only Memory) 1310 and a RAM (Random Access Memory) 1320.

Accordingly, the operations of the method or algorithm described in connection with the embodiments disclosed in the specification can be directly implemented with a hardware module, a software module, or any combination of the hardware module and the software module, which is executed by the processor(s) 1100. The software module can reside on a storage medium (that is, the memory 1300 and/or the storage 1600) such as a RAM, a flash memory, a ROM, an EPROM, an EEPROM, a register, a hard disc, a removable disk, a CD-ROM, or any combination thereof.

The exemplary storage medium can be coupled to the processor 1100. The processor 1100 can read out information from the storage medium and can write information in the storage medium. Alternatively, the storage medium can be integrated with the processor 1100. The processor and the storage medium can reside in an application specific integrated circuit (ASIC). The ASIC can reside within a user terminal. In another case, the processor and the storage medium can reside in the user terminal as separate components.

A description will be given of effects and advantages of the autonomous driving control apparatus and the method thereof according to an embodiment of the present disclosure.

According to at least one of embodiments of the present disclosure, the autonomous driving control apparatus can minimize the omission of data by using an image obtained by use of a road security mirror for an area (e.g., a portion of a road at an intersection) which is difficult to be obtained using a sensor device (e.g., a camera) and can perform autonomous driving control for the host vehicle while making use of such additional data.

Furthermore, according to at least one of embodiments of the present disclosure, the autonomous driving control apparatus can determine whether structures identified as a road security mirror meet a specified condition and can then perform autonomous driving control of the host vehicle using only the structures identified as meeting the specified condition, thus efficiently and accurately performing autonomous driving control for the host vehicle.

Furthermore, according to at least one of embodiments of the present disclosure, the autonomous driving control apparatus can obtain more pieces of data further using a road security mirror and can then perform autonomous driving control using the obtained pieces of data, when the host vehicle is traveling along a relatively dangerous driving route (e.g., an intersection), thus providing the user with a more stable driving experience.

In addition, various effects and advantages ascertained directly or indirectly through the present disclosure can be provided.

Hereinabove, although the present disclosure has been described with reference to exemplary embodiments and the accompanying drawings, embodiments of the present disclosure are not necessarily limited thereto, but can be variously modified and altered by those skilled in the art to which the present disclosure pertains without departing from the spirit and scope of the present disclosure claimed in the following claims.

Therefore, embodiments of the present disclosure are not necessarily intended to limit the technical spirit of the present disclosure, but are provided only for illustrative purposes. The scope of the present disclosure should be construed on the basis of the accompanying claims, and all the technical ideas within the scope equivalent to the claims can be included in the scope of the present disclosure.

What is claimed is:

1. An autonomous driving control apparatus comprising:
   a sensor device;
   a memory storing at least one instruction; and
   a controller operatively connected with the sensor device and the memory, wherein the at least one instruction is configured to, when executed by the controller, cause the autonomous driving control apparatus to perform operations comprising:
      determining that a road security mirror is present in front of a host vehicle, using the sensor device;

determining that the road security mirror meets a specified condition, in response to a vertical length of the road security mirror corresponding to a specified length;

stopping driving the host vehicle, in response to the road security mirror meeting the specified condition;

determining an image change rate of at least one security mirror included in the road security mirror; and resuming driving the host vehicle, in response to the image change rate being less than or equal to a specified value during a specified time.

2. The autonomous driving control apparatus of claim 1, wherein the at least one instruction is configured to, when executed by the controller, cause the autonomous driving control apparatus to perform the operations further comprising:

determining that the road security mirror meets the specified condition, in response to the road security mirror being present at a right of a driving direction of the host vehicle or the road security mirror comprising two security mirrors.

3. The autonomous driving control apparatus of claim 1, wherein the at least one instruction is configured to, when executed by the controller, cause the autonomous driving control apparatus to perform the operations further comprising:

determining that the road security mirror meets the specified condition, in response to a horizontal length of the road security mirror being greater than half of the vertical length of the road security mirror as viewed from the host vehicle.

4. The autonomous driving control apparatus of claim 1, wherein the at least one instruction is configured to, when executed by the controller, cause the autonomous driving control apparatus to perform the operations further comprising:

determining that the road security mirror does not meet the specified condition, in response to identifying that the road security mirror is present in an area within a specified angle with respect to a real-time driving direction of the host vehicle.

5. The autonomous driving control apparatus of claim 1, wherein the at least one instruction is configured to, when executed by the controller, cause the autonomous driving control apparatus to perform the operations further comprising:

determining that the road security mirror meets the specified condition, in response to a shortest distance from a furthest road line from the host vehicle among horizontal lines at an intersection being present in front of the host vehicle to the road security mirror and being within a specified range.

6. The autonomous driving control apparatus of claim 1, wherein the at least one instruction is configured to, when executed by the controller, cause the autonomous driving control apparatus to perform the operations further comprising:

identifying an expected driving route of the host vehicle;

identifying a specified security mirror among the at least one security mirror of the road security mirror, based on the expected driving route; and determining at least one road to identify the image change rate among roads in an image identified by use of the specified security mirror, based on the expected driving route.

7. The autonomous driving control apparatus of claim 6, wherein the at least one instruction is configured to, when executed by the controller, cause the autonomous driving control apparatus to perform the operations further comprising:

in response to the host vehicle traveling at a T-shaped intersection, identifying a left security mirror among the at least one security mirror of the road security mirror as the specified security mirror, in response to the expected driving route of the host vehicle corresponding to a right turn; and identifying the image change rate for a road above a center line among the roads in the image identified by use of the left security mirror.

8. The autonomous driving control apparatus of claim 6, wherein the at least one instruction is configured to, when executed by the controller, cause the autonomous driving control apparatus to perform the operations further comprising:

in response to the host vehicle traveling at a T-shaped intersection, identifying a left security mirror and a right security mirror among the at least one security mirror of the road security mirror as the specified security mirror, in response to the expected driving route of the host vehicle corresponding to a left turn;

identifying the image change rate for a road above a first center line among the roads in the image identified by use of the left security mirror; and identifying the image change rate for a road below a second center line among the roads in the image identified by use of the right security mirror.

9. The autonomous driving control apparatus of claim 6, wherein the at least one instruction is configured to, when executed by the controller, cause the autonomous driving control apparatus to perform the operations further comprising:

in response to the host vehicle traveling at a crossroads, identifying the image change rate for a road above a center line among the roads in the image identified by use of the specified security mirror;

identifying information about another vehicle in front of the host vehicle using the sensor device; and controlling driving motion of the host vehicle, in response to the image change rate being less than or equal to the specified value during the specified time and in response to determining that the host vehicle is able to travel along the expected driving route based on the information about the other vehicle.

10. An autonomous driving control method comprising:

determining, by a controller, that a road security mirror is present in front of a host vehicle, using a sensor device;

determining, by the controller, that the road security mirror meets a specified condition, in response to a vertical length of the road security mirror corresponding to a specified length;

stopping, by the controller, driving motion of the host vehicle, in response to the road security mirror meeting the specified condition;

determining, by the controller, an image change rate of at least one security mirror included in the road security mirror; and resuming, by the controller, driving the host vehicle in response to the image change rate being less than or equal to a specified value during a specified time.

11. The autonomous driving control method of claim 10, wherein controlling the driving motion of the host vehicle by the controller in response to the road security mirror meeting the specified condition comprises:

determining, by the controller, that the road security mirror meets the specified condition, in response to the road security mirror being present at a right of a driving direction of the host vehicle or the road security mirror comprising two security mirrors.

12. The autonomous driving control method of claim 10, wherein controlling the driving motion of the host vehicle by the controller in response to the road security mirror meeting the specified condition comprises:

determining, by the controller, that the road security mirror meets the specified condition, in response to a horizontal length of the road security mirror being greater than half of the vertical length of the road security mirror as viewed from the host vehicle.

13. The autonomous driving control method of claim 10, wherein controlling the driving motion of the host vehicle by the controller in response to the road security mirror meeting the specified condition comprises:

determining, by the controller, that the road security mirror does not meet the specified condition, in response to identifying that the road security mirror is present in an area within a specified angle with respect to a real-time driving direction of the host vehicle.

14. The autonomous driving control method of claim 10, wherein controlling the driving motion of the host vehicle by the controller in response to the road security mirror meeting the specified condition comprises:

determining, by the controller, that the road security mirror meets the specified condition, in response to a shortest distance from a furthest road line from the host vehicle among horizontal lines at an intersection being present in front of the host vehicle to the road security mirror and being within a specified range.

15. The autonomous driving control method of claim 10, further comprising:

identifying, by the controller, an expected driving route of the host vehicle;

identifying, by the controller, a specified security mirror among the at least one security mirror of the road security mirror, based on the expected driving route; and determining, by the controller, at least one road to identify the image change rate among roads in an image identified by use of the specified security mirror, based on the expected driving route.

16. The autonomous driving control method of claim 15, wherein determining the at least one road to identify the image change rate among the roads in the image identified by use of the specified security mirror based on the expected driving route by the controller comprises:

in response to the host vehicle traveling at a T-shaped intersection, identifying, by the controller, a left security mirror among the at least one security mirror of the road security mirror as the specified security mirror, in response to the expected driving route of the host vehicle corresponding to a right turn; and identifying, by the controller, the image change rate for a road above a center line among the roads in the image identified by use of the left security mirror.

17. The autonomous driving control method of claim 15, wherein determining the at least one road to identify the image change rate among the roads in the image identified by use of the specified security mirror based on the expected driving route by the controller comprises:

in response to the host vehicle traveling at a T-shaped intersection, identifying, by the controller, a left security mirror and a right security mirror among the at least one security mirror of the road security mirror as the specified security mirror, in response to the expected driving route of the host vehicle corresponding to a left turn;

identifying, by the controller, the image change rate for a road above a first center line among the roads in the image identified by use of the left security mirror; and identifying, by the controller, the image change rate for a road below a second center line among the roads in the image identified by use of the right security mirror.

18. The autonomous driving control method of claim 15, wherein determining the at least one road to identify the image change rate among the roads in the image identified by use of the specified security mirror based on the expected driving route by the controller comprises:

in response to the host vehicle traveling at a crossroads, identifying, by the controller, the image change rate for a road above a center line among the roads in the image identified by use of the specified security mirror;

identifying, by the controller, information about another vehicle in front of the host vehicle using the sensor device; and controlling, by the controller, the driving motion of the host vehicle, in response to the image change rate being less than or equal to the specified value during the specified time and in response to determining that the host vehicle is able to travel along the expected driving route based on whether there is the other vehicle.

19. An autonomous driving control apparatus comprising:

a sensor device;

a memory storing at least one instruction; and a controller operatively connected with the sensor device and the memory, wherein the at least one instruction is configured to, when executed by the controller, cause the autonomous driving control apparatus to perform operations comprising:

determining that a road security mirror is present in front of a host vehicle, using the sensor device;

determining that the road security mirror meets a specified condition, in response to a shortest distance from a furthest road line from the host vehicle of a plurality of horizontal lines at an intersection in front of the host vehicle to the road security mirror, the shortest distance being within a specified range;

stoppping driving the host vehicle, in response to the road security mirror meeting the specified condition;

determining an image change rate of at least one security mirror included in the road security mirror; and resuming driving the host vehicle, in response to the image change rate being less than or equal to a specified value during a specified time.

20. The autonomous driving control apparatus of claim 19, wherein the at least one instruction is configured to, when executed by the controller, cause the autonomous driving control apparatus to perform the operations further comprising:

determining that the road security mirror meets the specified condition, in response to a horizontal length of the road security mirror being greater than half of a vertical length of the road security mirror as viewed from the host vehicle.

* * * * *